March 11, 1947.                J. M. NAUL                 2,417,120
                           SHUNT UNIVERSAL MOTOR
                           Filed April 4, 1945

INVENTOR.
JAMES M. NAUL
BY
ATTORNEY.

Patented Mar. 11, 1947

2,417,120

UNITED STATES PATENT OFFICE 2,417,120

SHUNT UNIVERSAL MOTOR

James M. Naul, Plainfield, N. J.

Application April 4, 1945, Serial No. 586,597

7 Claims. (Cl. 172—276)

This invention relates to a new type of shunt universal motor which, as the term implies is of the commutator type so as to operate on D. C. or A. C. over a range of frequencies on the order of zero to seventy cycles that covers the range of commercial power supply.

Heretofore most universal motors have been of the series type that has a drooping speed-torque characteristic which is not satisfactory for many applications, and to meet this condition, these series motors have been equipped with elaborate mechanical governors that provide a more or less constant speed independent of load variations. This kind of speed-torque characteristic corresponds generally to the performance of a shunt motor.

In an endeavor to solve the problem, it has been proposed to connect a resisitance shunted by a condenser in series with the series winding and armature of the motor and eliminate the governor. It has also been proposed to use a shunt motor with the field winding connected in series with the parallel circuit of a resistance and condenser; but I have found, after considerable study and many tests, that all of these arrangements are not full solutions to the problem, for in order to obtain a practically constant speed with a varying load, the following must be attained:

First, a constant value of field flux; second, an armature with a constant applied E. M. F.; third, time-phase relation of field relative to the line E. M. F. such that the rotation of the armature in this field will produce a counter E. M. F. which, added to armature impedance drop, will equal the line E. M. F.

It is therefore the principal object of my invention to provide a construction and arrangement of parts of a shunt type universal motor which will meet the three requirements above stated.

Any electromagnetic field is set up by an inductive circuit, and in order to overcome some of this inductive reactance, it is necessary to pass the exciting current through a capacitor whose reactance acts to at least partially neutralize the inductance and thereby bring the exciting current and resultant magnetic field flux more nearly into phase with the implied E. M. F. This type of circuit would be satisfactory for alternating current only at a fixed frequency.

In order to operate the motor on D. C., it will be necessary to excite the field through a resistance preferably non-inductive and of such value that the resultant ampere turns of the field will be approximately the same as on A. C. The use of a resistance reduces the possibility of sharp resonance, which would be detrimental.

The proper use of a combination of capacitor and resistance results in the excitation of the field being of practically constant value and fixed time phase over the whole range of frequency from zero or D. C. to seventy cycles. It is further necessary to connect the capacitor and resistance to the shunt field of the motor in such a manner as to attain the desired results heretofore set forth with a minimum current and cost. This is essential as capacitors are relatively expensive and the greatest capacity effect per dollar of cost is obtained by increasing the voltage applied to the capacitor.

My improved arrangement will be better understood by reference to the annexed drawing wherein.

Figure 1:
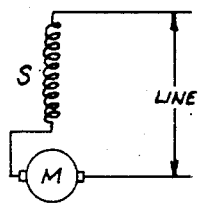
Figure 1 illustrates diagrammatically an ordinary series motor.
Figure 2:
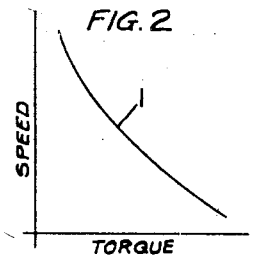
Figure 2 illustrates diagrammatically the speed-torque characteristic of the series motor of Figure 1.

Referring now to the details, M represents the armature of a motor having a series field S. The speed-torque characteristic of the construction of Figure 1 is illustrated by the curve I of Figure 2 which is old and well known.

Figure 3:
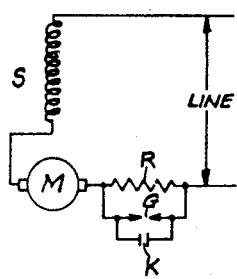
Figure 3 illustrates diagrammatically the usual universal motor which is of the series type, having a parallel arrangement of resistance capacity operatively controlled by a governor.
Figure 4:
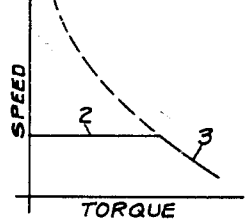
Figure 4 illustrates diagrammatically the speed-torque curve of the arrangement shown in Figure 3.

In Figure 3 the resistance R is shunted by a capacity K, the action of the two being controlled by a governor whose contacts are illustrated at G. The speed-torque characteristic of the construction of Figure 3 is illustrated by the line 2—3 of Figure 4. Figures 1 to 4 inclusive are shown merely in order that the reader of this specification may have before him certain of the prior art.

Figure 5:
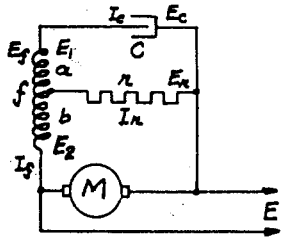
Figure 5 shows my improved arrangement utilizing a shunt motor.

In my improved type of construction, diagrammatically illustrated in Figure 5, the motor armature M has an exciting field winding f made up, in effect, of two parts $a$ and $b$, to the junction of which a non-inductive resistance $r$ is coupled, the opposite end of the resistance $r$ being connected to one side of the line. Between one end of the field winding $a$ and the line side of the resistance $r$, is a capacitor $c$. The part $a$ of the field winding $f$ is excited by current flowing through the capacitor $c$, while the part $b$ is excited by current through both the capacitor $c$ and resistance $r$. I have found from analysis and experiment that a high value of voltage $E$ across the capacitor will lower the size and cost of the capacitor, but such a value of $E_c$ will run too high for a reasonable amount of resistance $r$.

Therefore I have found it necessary to provide an arrangement where the resistance $r$ is tapped into the field to properly utilize a lower value of voltage across the capacitor, and the value of the resistance $r$ must be such that its resistance, plus the resistance of the winding $b$, divided into the line voltage, will give a current which, when multiplied by the number of turns in the winding $b$, will provide the necessary ampere turns to produce the required field flux. In other words, it is essential that the values of $E_c$ and $E_r$ be relatively independent of each other so that one can choose the most economical values of capacitor and resistance. Furthermore, I have found that the separation of $E_c$ and $E_r$ allows a larger latitude of design and hence a much better motor.

It is essential that the current $I_c$ be normal to $E_c$ and its current $I_r$ be in phase with $E_r$. The vector sum of $I_c$ and $I_r$ is then equal to $I$, which is the exciting current and produces the required field flux, but due to the separation of $E_c$ and $E_r$, the two vector currents $I_c$ and $I_r$ are at an angle greater than ninety degrees to each other, with the result that smaller values of each are required to produce the exciting current $I$.

There is a further advantage in separating the motor field into two sections $a$ and $b$ as these sections may be so spaced on the field structure as to cause an angular shift of the flux relative to the motor brushes. This shift in the field flux tends to neutralize the armature reaction and reduces the reactive component, and this results in a reduction of the variation of the counter E. M. F. and hence reduces the difference of speed which the motor might have between operation on sixty-cycle A. C. and on D. C. under the same load condition.

Figure 6:
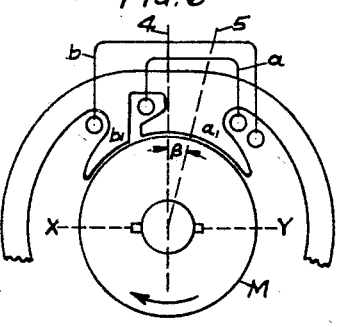
Figure 6 shows an arrangement of the field windings of the motor of Figure 5 which will produce the desired results.

In Figure 6, I have shown the motor armature M with one pole of a two-pole field structure, it being understood that the other pole is similar to the one shown. In this construction each pole is divided into two parts $a_1$ and $b_1$, the windings $a$ and $b$ being positioned on these parts as indicated in Figure 6, but connected as indicated in Figure 5. The magnetic neutral of the armature M is in line with the brushes along the line X—Y. It is well known that armature reaction is reduced by shifting the field flux in the same direction as the armature rotation. It is also known that as the frequency increases, it becomes necessary to increase the field shift in order to keep the armature reactance within reasonable amounts, thereby keeping the sixty-cycle and D. C. speeds close together throughout the load range.

On D. C., the current through the winding $a$ is zero and the center line of the field is shown by the broken line 4 due to the current $I_r$ in the winding $b$. As the frequency increases, the current $I_c$ increases and the current $I_r$ decreases. As $I_c$ increases, the current in the winding $a$ increases and therefore the field advances toward the center line 5 of the winding or coil $a$. The result is a shift of field as shown by the angle B, and this field shift being in the direction of rotation will tend to automatically bring the speed-torque curves together on D. C. and A. C. up to seventy cycles.

Figure 7:
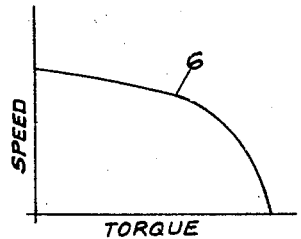
Figure 7 is a speed-torque characteristic curve of the arrangement shown in Figures 5 and 6.

With the arrangement and connection of the parts described, I have produced a shunt universal motor which will meet the requirements heretofore specified and will give a speed-torque characteristic as exemplified by the curve 6 of Figure 7.

From the foregoing presentation, it will be seen that I have eliminated the use of a more or less complicated governor and other mechanical control means used at the present time in most universal motors, and that I have produced a shunt motor which depends upon the inherent design and arrangement of the parts of the motor for attaining the desirable characteristics which make it universal in its application by having a fairly constant speed over its operating torque range.

What I claim is:

1. A universal motor of the commutator type for operation on both D. C. and A. C., the motor having a condenser and a field winding connected in series, while both are connected in shunt across the motor armature and line, and a resistance having one end tapped into the field winding and its other end connected to the line side of the condenser.

2. A shunt motor capable of operation on both D. C. and A. C., the shunt field winding of the motor having a condenser connected in series therewith across the motor armature and line, and a resistance preferably of the non-inductive type connected in parallel with the condenser and a part of the shunt field.

3. A shunt universal motor of the commutator type for operation on D. C. and A. C. within the commercial range of frequency, the motor having a resistance connected in series with part of the shunt field winding of the motor and a condenser connected in series with the whole of the shunt field winding, the resistance and condenser having a common connection to one side of the motor armature and line, while one end of the field winding is connected to the other side of the motor armature and line.

4. A shunt universal motor as set forth in claim 3, further characterized in that the poles of the motor are divided and the shunt field winding is arranged on divided sections of each pole, that part of the winding directly in series with said resistance embracing all of said pole sections, while that part of the winding which is only directly in the condenser circuit embraces only one section of each pole.

5. A shunt universal motor as set forth in claim 3, further characterized in that each pole of the motor is arranged in two sections, one section having a longer arcuate length than the other section for cooperation with the motor armature, that part of the field winding which is directly in series with the condenser being arranged on the pole section having the longest arcuate length, while that part of the field winding which is directly in series with said resistance embraces both sections of each pole.

6. A shunt universal motor as set forth in claim 3, further characterized in that each pole of the motor is arranged in two sections, one section having a longer arcuate length than the other section for cooperation with the motor armature, the sections of shorter arcuate length being positioned toward the direction of rotation of the armature, and that part of the field winding directly in series with the resistance embracing both sections of all the poles, while that part of the field winding directly in series with the condenser is located on the pole sections of longer arcuate length.

7. A shunt universal motor as set forth in claim 3, further characterized in that field poles are divided into sections and the windings arranged thereon so the armature reaction, when operating from A. C., acts to shift the field flux toward the center line of the winding which is directly in series with the condenser for the purpose described.

JAMES M. NAUL.

REFERENCES CITED

The following references are of record in the file of this patent:

FOREIGN PATENTS

| Number | Country | Date |
|--------|---------|------|
| 408,200 | British | 1932 |